(12) United States Patent
Falk

(10) Patent No.: US 6,771,187 B2
(45) Date of Patent: Aug. 3, 2004

(54) PRINTING STATION LOCATED IN THE BACK OF MASS TRANSIT VEHICLE SEATS

(75) Inventor: Kevin Lloyd Falk, Boise, ID (US)

(73) Assignee: Hewlett-Packard Development, Houston, TX (US)

( * ) Notice: Subject to any disclaimer, the term of this patent is extended or adjusted under 35 U.S.C. 154(b) by 0 days.

(21) Appl. No.: 10/104,834

(22) Filed: Mar. 22, 2002

(65) Prior Publication Data
US 2003/0179545 A1 Sep. 25, 2003

(51) Int. Cl.[7] .............................................. G01C 21/00
(52) U.S. Cl. ...................... 340/971; 340/945; 224/275; 224/427
(58) Field of Search ................................. 340/971, 945, 340/815.4; 224/275, 237, 282, 427; 348/14.03; 345/700

(56) References Cited

U.S. PATENT DOCUMENTS

| 4,774,514 A | 9/1988 | Hildebrandt et al. ........ 340/971 |
| 4,866,515 A | 9/1989 | Tagawa et al. ............... 358/86 |
| 4,896,209 A * | 1/1990 | Matsuzaki et al. ............. 358/86 |
| 4,909,159 A | 3/1990 | Gonsoulin .................... 108/44 |
| 5,092,507 A | 3/1992 | Szablak et al. ............. 224/275 |
| 5,185,857 A * | 2/1993 | Rozmanith et al. ......... 395/148 |
| 5,311,302 A * | 5/1994 | Berry et al. ................... 348/14 |
| 5,542,589 A | 8/1996 | McKee ........................ 224/275 |
| 5,551,616 A | 9/1996 | Stitt et al. .................... 224/275 |
| 5,881,934 A | 3/1999 | Hung .......................... 224/275 |
| 5,951,128 A | 9/1999 | Aidone et al. ........... 312/235.8 |
| 5,966,285 A | 10/1999 | Sellers ........................ 361/686 |
| 5,973,917 A | 10/1999 | White ......................... 361/683 |
| 6,034,688 A * | 3/2000 | Greenwood et al. ........ 345/353 |
| 6,038,426 A * | 3/2000 | Williams, Jr. ................ 455/6.2 |
| 6,058,288 A | 5/2000 | Reed et al. .................. 455/6.3 |
| 6,177,887 B1 | 1/2001 | Jerome ........................ 340/945 |
| 6,273,310 B1 | 8/2001 | Gregory ..................... 224/275 |
| 6,421,525 B1 * | 7/2002 | Prewitt ........................ 434/350 |
| 6,665,089 B1 * | 12/2003 | Austin et al. .............. 358/1.18 |

* cited by examiner

Primary Examiner—Toan N. Pham
(74) Attorney, Agent, or Firm—James R. McDaniel

(57) ABSTRACT

This invention relates to printing stations. Such structures of this type, generally, proved for a printing station to be located in the back of mass transit vehicle seats such that the mass transit rider can be able to view and subsequently print that viewed information.

12 Claims, 2 Drawing Sheets

PRINTING STATION LOCATED IN THE BACK OF MASS TRANSIT VEHICLE SEATS

FIELD OF THE INVENTION

This invention relates to printing stations. Such structures of this type, generally, provide for a printing station to be located in the back of mass transit vehicle seats such that the mass transit rider can be able to view and subsequently print that viewed information.

DESCRIPTION OF THE RELATED ART

Prior to the present invention, as set forth in general terms above and more specifically below, it is known, in the printer art, to employ centralized printers in mass transit vehicles, such as airplanes. Exemplary of such prior art are U.S. Pat. No. 4,774,514 ('514) to F. Hildebrandt et al., entitled "Method and Apparatus for Carrying Out Passenger-Related and Flight Attendant-Related Functions in an Airplane," U.S. Pat. No. 6,058,288 ('288) to D. P. Reed et al., entitled "Passenger Service and Entertainment System," and U.S. Pat. No. 6,177,887 ('887) to G. A. Jerome, entitled "Multi-Passenger Vehicle Catering and Entertainment System." While the '514, '288, and '887 references disclose printers for use in mass transit vehicles, the printers are centralized printers which require that an attendant shuttle printed materials back to the passengers and/or the passengers would be required to get out of their seats in order to retrieve the printed materials which could cause safety concerns. Also, the passenger is not afforded much privacy with respect to who has access to the printed document. Therefore, a more advantageous system, then, would be presented if each passenger had access to his/her own printer located in the seatback in front of the passenger so that the passenger is afforded some privacy without having to get out of his/her seat.

It is also known, the mass transit vehicle seat art, to install a telephone and a display panel in the seat back. While this affords the passenger some convenience in being able to use the telephone without having to leave his/her seat, if the passenger wants to print something, these prior art systems do not allow for such printing. Therefore, a further advantageous system, then, would be provided if the passenger were able to print out the desired information at his/her seat.

It is apparent from the above that there exists a need in the art for a printer system for use in a mass transit vehicle which allows the user to print documents without having to get out of the passenger seat, but which at the same time provides the user with a modicum of privacy with respect to who can view the document to the printed. It is a purpose of this invention to fulfill this and other needs in the art in a manner more apparent to the skilled artisan once given the following disclosure.

SUMMARY OF THE INVENTION

Generally speaking, this invention fulfills these needs by providing a mass transit vehicle seat printing station, wherein the station is comprised of: a mass transit vehicle seat having a seat back; a display means located within the seat back; a printing means located within the seat back and operatively connected to the display means; and a control means located within the seat back and operatively connected to the display means and the printing means in order to control the display means and the printing means.

In certain preferred embodiments, the mass transit vehicle can be, but is not limited to, an airplane, a bus, a train, passenger ship or the like. Also, the display means includes a display monitor for Web based interaction and, possibly, a smaller 2-4 line display. Also, the printing means includes a small inkjet or thermal color printer. Also, the control means can be a control panel that includes alphanumeric keys, print buttons, and scroll buttons. Finally, the printing station may include an IR port or other such types of connectors that will provide access to and power for the user's mobile devices, such as laptop computers, cell phones, personal digital assistants (PDAs) or the like.

In another further preferred embodiment, the user is able to view information on the display located in the mass transit vehicle seat back printing station and, possibly, print that information without having to leave his his/her seat or have to share the information with others.

The preferred mass transit vehicle printing station, according to this invention, offers the following advantages: excellent printing characteristics; excellent document viewing characteristics; excellent document controlling characteristics; increased privacy; increased passenger safety; ability to interact with mobile devices; and excellent economy. In fact, in many of the preferred embodiments, these factors of excellent printing characteristics, excellent document viewing characteristics, excellent document controlling characteristics, increased privacy, increased passenger safety, and ability to interact with minimal devices are optimized to an extent that is considerably higher than heretofore achieved in prior, known mass transit vehicle printing stations.

The above and other features of the present invention, which will become more apparent as description proceeds, are best understood by considering the following detailed description in conjunction with the accompanying drawings, wherein like characters represent like parts throughout the several views and in which:

DETAILED DESCRIPTION OF THE INVENTION

Figure 1:
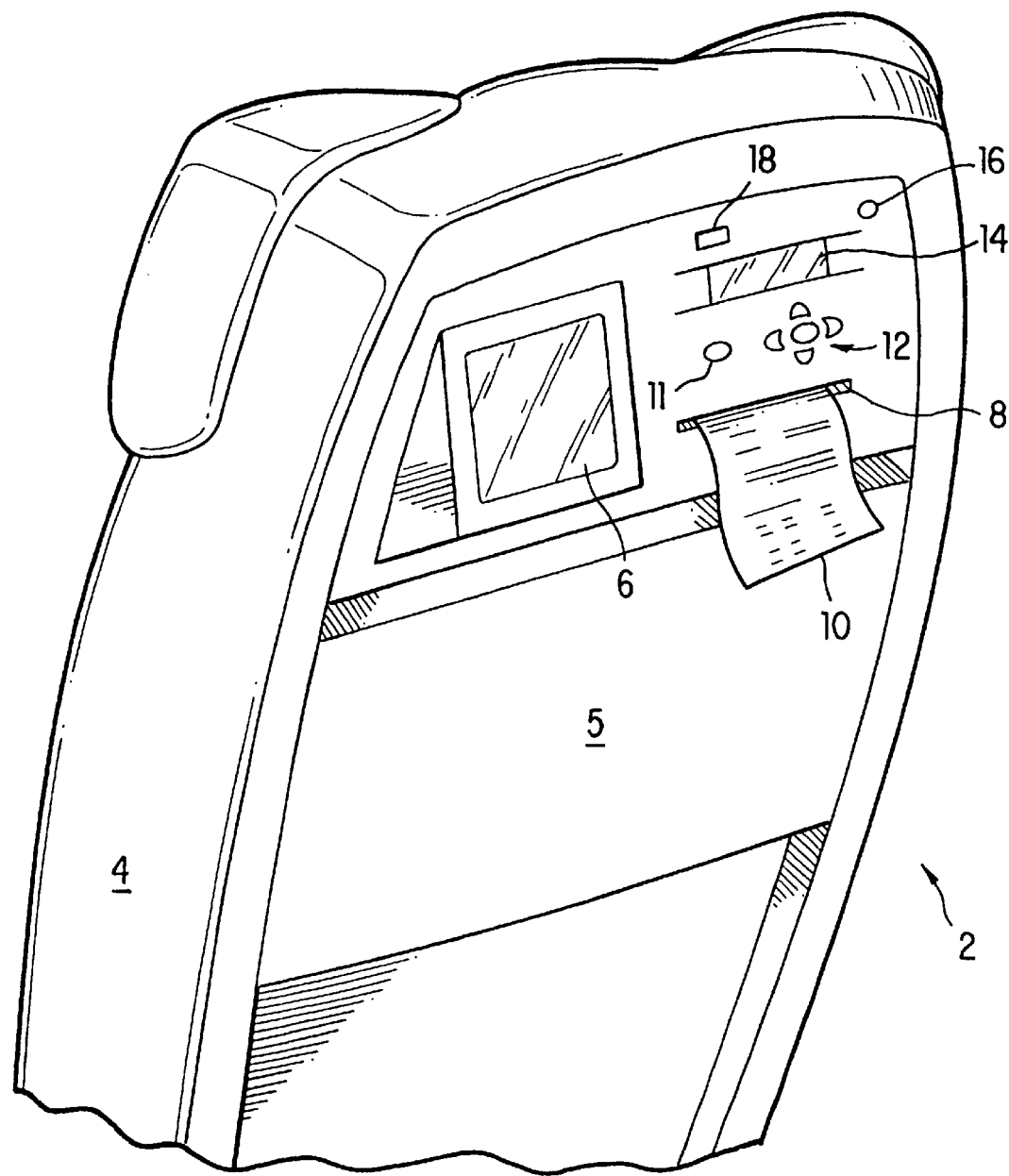
FIG. 1 is a schematic illustration of a mass transit vehicle printing station, according to one embodiment of the present invention.

With reference first to FIG. 1, there is illustrated one preferred embodiment for use of the concepts of this invention. FIG. 1 illustrates printing station 2. Printing station 2 includes, in part, conventional mass transit vehicle seat back 4, conventional mass transit vehicle seat back tray 5, display 6, printer 8, printed document 10, control panel buttons 11 and 12, secondary display 14, IR port 16, and power and workstation/Internet access connections 18.

Display 6, preferably, is any suitable display monitor that will adequately fit within mass transit vehicle seat back 4 and allow for the display of any Internet based interaction between the user and printing station 2. Printer 8, preferably, is any suitable small inkjet or thermal color printer which is capable of printing document 10 and which will adequately fit within mass transit vehicle seat back 4. Printed document 10, preferably, is any document that is printed on conventional 4" by 6" media or any other suitable media size. Control panel buttons 11 and 12, preferably, should include a keyboard having alphanumeric keys, scroll keys, print keys or the like which will allow the user to interact with and/or manipulate the information displayed on display 6 and/or any mobile devices (not shown) connected to printing station 2 through power and workstation/Internet access connections 18. Mobile devices can be, but are not limited to, laptop computers, personal digital assistants (PDA) or the like. As a possible addition, secondary display 14, preferably, is a smaller 2-4 line display that can be added to allow the user to view various documents at printing station 2 at the same time. IR port 16, preferably, allows the user to conventionally, electronically transmit machine-readable data from any mobile devices (not shown) to printing station 2 so that the data can be viewed on displays 6 and/or 14 and/or printed by printer 8. Power and workstation/Internet access connections 18, preferably, allow the user to connect any mobile device (not shown) to printing station 2 so that the mobile device can be powered by printing station 2 and/or the mobile device can conventionally download information to and receive information from printing station 2. It is to be understood that printing station 2 is, preferably, conventionally connected to the Internet in order to allow the user to have Web based interaction access.

Figure 2:
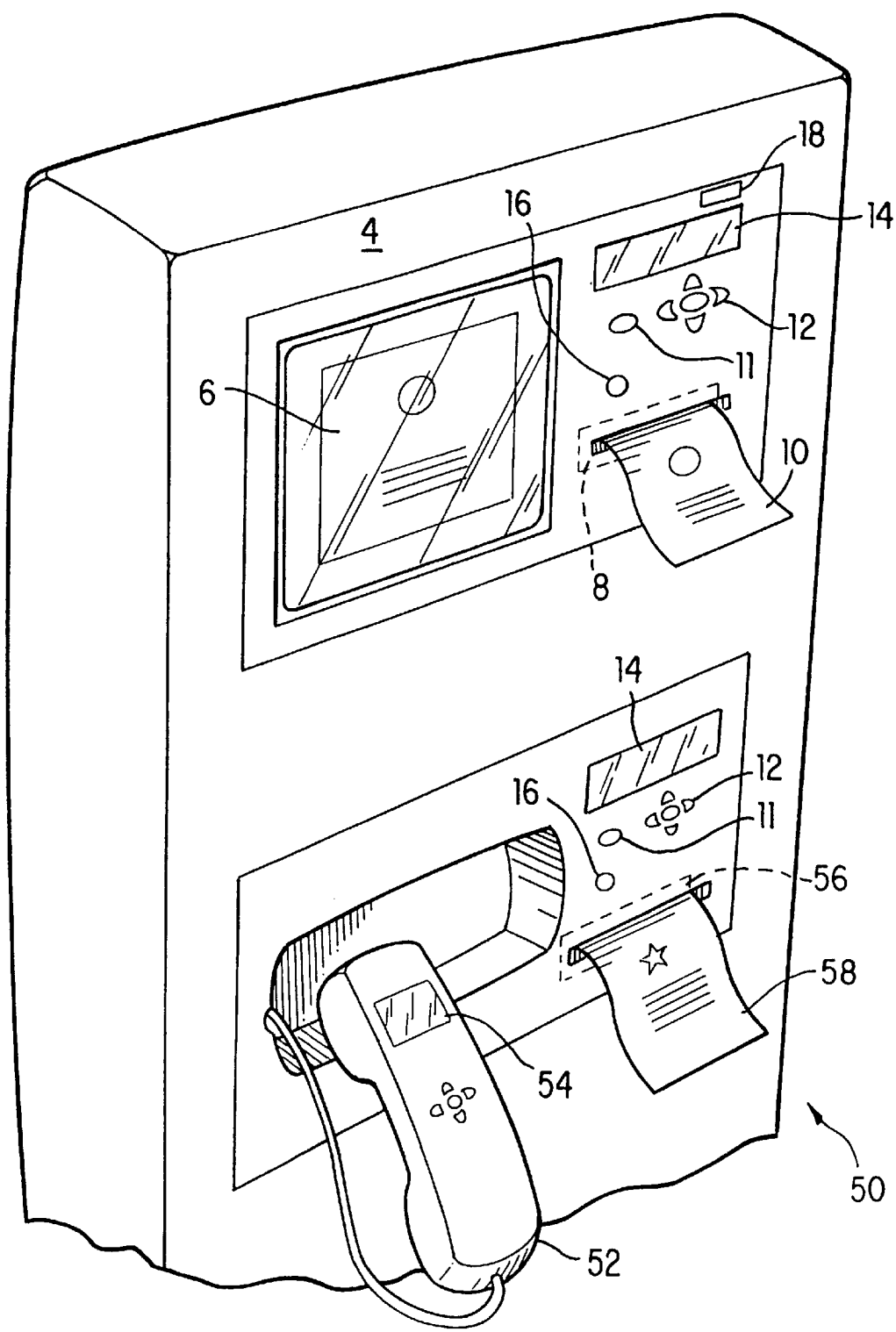
FIG. 2 is a schematic illustration of another mass transit vehicle printing station, according to a second embodiment of the present invention.

With reference to FIG. 2, there is illustrated another preferred embodiment for use of the concepts of this invention. FIG. 2 shows printing station 50. Printing station 50 includes, in part, conventional mass transit vehicle seat back 4, display 6, printer 8, printed document 10, control panel buttons 11 and 12, secondary display 14, IR port 16, power and workstation/Internet access connections 18, telephone head set 52, telephone display 54, printer 56, and document 58. It is to be understood that printer 56 is, preferably, constructed in the same manner as printer 8 (FIG. 1).

During the operation of printing station 2 (FIG. 1), the user may elect to fold down mass transit vehicle seat back tray 5 and place a mobile device (not shown), such as a laptop computer on tray 5. The user then would be able to do many things with print station 2. For example, the user may already have information on the laptop computer that the user wants to be printed. The user conventionally transmits the information from the mobile device to IR port 16 where the information can be subsequently printed by printer 8. Also, the user may need to utilize the power and workstation/Internet access connections 18 in order to provide power to the mobile device and/or transmit information to printing station 2 so that it can be printed by printer 8 if the mobile device lacks the proper equipment to interact with IR port 16. Power and workstation/Internet access connections 18 can also be used to transfer information from the Internet to printing station 2 and/or the mobile device. After the user has connected to printing station 2, the user may use the alphanumeric keyboard located on the mobile device in order to manipulate the information on displays 6 and 14 and/or the display on the mobile device. The user may also elect to manipulate control panel buttons 11 and 12 in order to manipulate the information on displays 6 and 14 and/or the display on the mobile device. Finally, the user may decide to use the telephone (FIG. 2) for variety of personal/business-related reasons. As shown in FIG. 2, printer 56 can be used to print document 58 that is a hard copy of what is displayed on telephone display 54.

Finally, it is to be understood that printing station 2 can be located adjacent to the seat that the passenger is sitting in, such as a seat compartment beside the seat and/or below the seat, so long as the passenger has easy access to printing station 2.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A mass transit vehicle seat including a permanently installed printing station, comprising:
    a mass transit vehicle seat having a seat back;
    a display means for displaying interactions between a user and a printer means located within said seat back;
    said printing means for printing a document located within said seat back and operatively connected to said display means, wherein said printing station is further comprised of, an IR port for allowing electronic transmission of machine-readable data from a mobile device to said printing station;
    a telephone means for conducting personal/business-related matters; and
    a control means for interacting with said display means located within said seat back and operatively connected to said display means, said printing means, and said telephone means in order to control said display means and said printing means.

2. The printing station, as in claim 1, wherein said display means is further comprised of:
    at least one display monitor.

3. The printing station, as in claim 1, wherein said printing means is further comprised of:
    an inkjet color printer.

4. The printing station, as in claim 1, wherein said printing means is further comprised of:
    a thermal color printer.

5. The printing station, as in claim 1, wherein said control means is further comprised of:
    a keyboard.

6. The printing station, as in claim 5, wherein said keyboard is further comprised of:
    a plurality of alphanumeric keys.

7. The printing station, as in claim 5, wherein said keyboard is further comprised of:
    at least one scroll key.

8. The printing station, as in claim 5, wherein said keyboard is further comprised of:
    at least one print key.

9. The printing station, as in claim 1, wherein said printing station is further comprised of:
    a mobile device power connection means.

10. The printing station, as in claim 1, wherein said printing station is further comprised of:
    a workstation/Internet access connection means.

11. The printing station, as in claim 1, wherein said printing means is further comprised of:
    at least one printer.

12. The printing station, as in claim 1, wherein said telephone means is further comprised of:
    telephone heed set; and
    telephone display means located substantially on said telephone.

* * * * *

UNITED STATES PATENT AND TRADEMARK OFFICE
CERTIFICATE OF CORRECTION

PATENT NO. : 6,771,187 B2
DATED : August 3, 2004
INVENTOR(S) : Kevin Lloyd Falk

It is certified that error appears in the above-identified patent and that said Letters Patent is hereby corrected as shown below:

Column 4,
Line 61, delete "heed" and insert therefor -- head --

Signed and Sealed this

Thirty-first Day of May, 2005

JON W. DUDAS
*Director of the United States Patent and Trademark Office*